United States Patent
Merlin et al.

(10) Patent No.: US 9,923,822 B2
(45) Date of Patent: Mar. 20, 2018

(54) METHODS AND APPARATUS FOR MULTIPLE USER UPLINK

(71) Applicant: QUALCOMM Incorporated, San Diego, CA (US)

(72) Inventors: Simone Merlin, Solana Beach, CA (US); Gwendolyn Denise Barriac, Encinitas, CA (US); Hemanth Sampath, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 14/469,306

(22) Filed: Aug. 26, 2014

(65) Prior Publication Data
US 2015/0063258 A1    Mar. 5, 2015

Related U.S. Application Data

(60) Provisional application No. 61/871,269, filed on Aug. 28, 2013.

(51) Int. Cl.
*H04L 12/801*    (2013.01)
*H04L 12/851*    (2013.01)
(Continued)

(52) U.S. Cl.
CPC ........... *H04L 47/12* (2013.01); *H04B 7/0452* (2013.01); *H04B 7/2621* (2013.01);
(Continued)

(58) Field of Classification Search
CPC .................................................... H04W 28/04
(Continued)

(56) References Cited

U.S. PATENT DOCUMENTS

| 7,352,718 B1 | 4/2008 | Perahia et al. |
| 7,376,122 B2 | 5/2008 | Draves, Jr. et al. |

(Continued)

FOREIGN PATENT DOCUMENTS

| EP | 1589784 A2 | 10/2005 |
| EP | 2429250 A1 | 3/2012 |

(Continued)

OTHER PUBLICATIONS

Gong M.X., et al., "Multi-User Operation in mmWave Wireless Networks", ICC 2011-2011 IEEE International Conference on Communications—dated Jun. 5-9, 2011—Kyoto,Japan, IEEE, Piscataway, NJ, USA, Jun. 5, 2011 (Jun. 5, 2011), pp. 1-6, XP031908919.

(Continued)

*Primary Examiner* — Samina Choudhry
(74) *Attorney, Agent, or Firm* — Knobbe, Martens, Olson & Bear LLP

(57) ABSTRACT

A method for wireless communication is provided. The method comprises transmitting a first wireless message comprising a request for a first user terminal to transmit uplink data and an indication of at least one requested operational parameter. The method also comprises receiving a second wireless message from an access point in response to the first wireless message, the second wireless message indicating whether a plurality of user terminals including the first user terminal is selected to transmit uplink data, the second wireless message indicating at least one operational parameter for transmission of uplink data based on the at least one requested operational parameter.

36 Claims, 9 Drawing Sheets

(51) Int. Cl.
| | |
|---|---|
| *H04B 7/26* | (2006.01) |
| *H04L 5/00* | (2006.01) |
| *H04W 72/04* | (2009.01) |
| *H04B 7/0452* | (2017.01) |
| *H04W 52/14* | (2009.01) |
| *H04L 1/18* | (2006.01) |
| *H04W 72/12* | (2009.01) |
| *H04W 74/00* | (2009.01) |
| *H04W 74/04* | (2009.01) |
| *H04L 1/16* | (2006.01) |
| *H04L 1/00* | (2006.01) |
| *H04W 28/24* | (2009.01) |
| *H04W 74/08* | (2009.01) |
| *H04W 28/06* | (2009.01) |

(52) U.S. Cl.
CPC .......... *H04L 1/1854* (2013.01); *H04L 1/1858* (2013.01); *H04L 1/1861* (2013.01); *H04L 5/003* (2013.01); *H04L 5/0005* (2013.01); *H04L 5/0007* (2013.01); *H04L 5/0037* (2013.01); *H04L 5/0055* (2013.01); *H04L 47/14* (2013.01); *H04L 47/24* (2013.01); *H04W 52/146* (2013.01); *H04W 72/042* (2013.01); *H04W 72/0413* (2013.01); *H04W 72/0446* (2013.01); *H04W 72/0453* (2013.01); *H04W 72/12* (2013.01); *H04W 72/1284* (2013.01); *H04W 72/1289* (2013.01); *H04W 74/006* (2013.01); *H04W 74/008* (2013.01); *H04W 74/04* (2013.01); *H04W 74/08* (2013.01); *H04L 1/1607* (2013.01); *H04L 2001/0093* (2013.01); *H04W 28/06* (2013.01); *H04W 28/24* (2013.01); *H04W 72/121* (2013.01); *H04W 74/085* (2013.01)

(58) Field of Classification Search
USPC .......................................................... 370/329
See application file for complete search history.

(56) References Cited

U.S. PATENT DOCUMENTS

| | | | |
|---|---|---|---|
| 7,995,583 B2 | 8/2011 | Del et al. | |
| 8,571,010 B1 | 10/2013 | Zhang et al. | |
| 8,867,329 B2 | 10/2014 | Hui et al. | |
| 9,113,478 B2 | 8/2015 | Wentink | |
| 9,137,815 B2 | 9/2015 | Sampath et al. | |
| 9,253,767 B2 | 2/2016 | Wang et al. | |
| 2002/0105970 A1 | 8/2002 | Shvodian | |
| 2003/0091066 A1 | 5/2003 | Choi et al. | |
| 2005/0195784 A1 | 9/2005 | Freedman et al. | |
| 2007/0058605 A1 | 3/2007 | Meylan et al. | |
| 2007/0110055 A1 | 5/2007 | Fischer et al. | |
| 2007/0230493 A1 | 10/2007 | Dravida et al. | |
| 2007/0248117 A1 | 10/2007 | Zuniga et al. | |
| 2008/0037570 A1 | 2/2008 | Kim et al. | |
| 2008/0151831 A1 | 6/2008 | Khan et al. | |
| 2008/0273488 A1* | 11/2008 | Shaheen ............. | H04W 76/027 370/328 |
| 2009/0040970 A1 | 2/2009 | Ahmadi et al. | |
| 2009/0067358 A1 | 3/2009 | Fischer | |
| 2009/0116434 A1 | 5/2009 | Lohr et al. | |
| 2009/0147768 A1* | 6/2009 | Ji ........................ | H04J 3/0664 370/350 |
| 2010/0008318 A1 | 1/2010 | Wentink et al. | |
| 2010/0271992 A1 | 10/2010 | Wentink et al. | |
| 2010/0284393 A1 | 11/2010 | Abraham et al. | |
| 2010/0298016 A1* | 11/2010 | Madan ................ | H04J 11/0053 455/501 |
| 2010/0315999 A1 | 12/2010 | Kakani et al. | |
| 2011/0075759 A1 | 3/2011 | Seok | |
| 2011/0090855 A1 | 4/2011 | Kim | |
| 2011/0116435 A1 | 5/2011 | Liu et al. | |
| 2011/0116487 A1 | 5/2011 | Grandhi | |
| 2011/0134900 A1 | 6/2011 | Liu et al. | |
| 2011/0150004 A1 | 6/2011 | Denteneer et al. | |
| 2011/0154144 A1 | 6/2011 | Nanda | |
| 2011/0205968 A1 | 8/2011 | Kim et al. | |
| 2011/0205997 A1 | 8/2011 | Chun et al. | |
| 2011/0222408 A1 | 9/2011 | Kasslin et al. | |
| 2011/0222499 A1 | 9/2011 | Park et al. | |
| 2011/0261708 A1 | 10/2011 | Grandhi | |
| 2011/0268054 A1* | 11/2011 | Abraham ............. | H04W 74/06 370/329 |
| 2011/0268094 A1 | 11/2011 | Gong et al. | |
| 2011/0286402 A1 | 11/2011 | Gong et al. | |
| 2011/0305205 A1 | 12/2011 | Gong et al. | |
| 2011/0305209 A1* | 12/2011 | Merlin ................ | H04L 1/0001 370/329 |
| 2012/0026928 A1 | 2/2012 | Gong et al. | |
| 2012/0057471 A1 | 3/2012 | Amini et al. | |
| 2012/0060075 A1 | 3/2012 | Gong et al. | |
| 2012/0117446 A1 | 5/2012 | Taghavi et al. | |
| 2012/0124263 A1* | 5/2012 | Zhou ................. | H04W 72/0486 710/240 |
| 2012/0147804 A1 | 6/2012 | Hedayat et al. | |
| 2012/0177018 A1 | 7/2012 | Abraham et al. | |
| 2012/0207071 A1 | 8/2012 | Zhu et al. | |
| 2012/0218983 A1 | 8/2012 | Noh et al. | |
| 2012/0314697 A1 | 12/2012 | Noh et al. | |
| 2012/0327915 A1* | 12/2012 | Kang .................... | H04L 5/0007 370/336 |
| 2013/0114606 A1 | 5/2013 | Schrum, Jr. et al. | |
| 2013/0114622 A1 | 5/2013 | Veyseh et al. | |
| 2013/0188567 A1 | 7/2013 | Wang et al. | |
| 2013/0286959 A1 | 10/2013 | Lou et al. | |
| 2014/0173682 A1 | 6/2014 | Xiao et al. | |
| 2014/0269544 A1 | 9/2014 | Zhu et al. | |
| 2014/0334387 A1 | 11/2014 | Doppler et al. | |
| 2015/0063111 A1 | 3/2015 | Merlin et al. | |
| 2015/0063190 A1 | 3/2015 | Merlin et al. | |
| 2015/0063191 A1 | 3/2015 | Merlin et al. | |
| 2015/0063257 A1 | 3/2015 | Merlin et al. | |
| 2015/0063291 A1 | 3/2015 | Merlin et al. | |
| 2015/0063318 A1 | 3/2015 | Merlin et al. | |
| 2015/0063320 A1 | 3/2015 | Merlin et al. | |
| 2016/0021678 A1 | 1/2016 | Merlin et al. | |
| 2016/0294530 A1 | 10/2016 | Merlin et al. | |

FOREIGN PATENT DOCUMENTS

| | | |
|---|---|---|
| JP | 2013135426 A | 7/2013 |
| KR | 20110058709 A | 6/2011 |
| WO | WO-2008155624 A2 | 12/2008 |

OTHER PUBLICATIONS

IEEE Standard for Information technology—Telecommunications and information exchange between systems—Local and metropolitan area networks—Specific requirements—Part 11: Wireless LAN Medium Access Control (MAC) and Physical Layer (PHY) Specifications/Part 11, IEEE Std 802.11; Jun. 12, 2007, pp. 251-312; XP002555935.
International Search Report and Written Opinion—PCT/US2014/052884—ISA/EPO—dated Nov. 17, 2014.

* cited by examiner

METHODS AND APPARATUS FOR MULTIPLE USER UPLINK

CROSS REFERENCE TO RELATED APPLICATIONS

This application claims priority to U.S. Provisional Application No. 61/871,269 filed Aug. 28, 2013, and entitled "METHODS AND APPARATUS FOR MULTIPLE USER UPLINK." The content of this prior application is considered part of this application, and is hereby incorporated by reference in its entirety.

FIELD

Certain aspects of the present disclosure generally relate to wireless communications, and more particularly, to methods and apparatus for multiple user uplink communication in a wireless network.

BACKGROUND

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple user terminals to communicate with a single access point by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for wireless communication. The method comprises transmitting a first wireless message comprising a request for a first user terminal to transmit uplink data and an indication of at least one requested operational parameter. The method also comprises receiving a second wireless message from an access point in response to the first wireless message, the second wireless message indicating whether a plurality of user terminals including the first user terminal is selected to transmit uplink data, the second wireless message indicating at least one operational parameter for transmission of uplink data based on the at least one requested operational parameter.

Another aspect of the disclosure provides a device for wireless communication. The device comprises a transmitter configured to transmit a first wireless message comprising a request for a first user terminal to transmit uplink data and an indication of at least one requested operational parameter. The device also comprises a receiver configured to receive a second wireless message from an access point in response to the first wireless message, the second wireless message indicating whether a plurality of user terminals including the first user terminal is selected to transmit uplink data, the second wireless message indicating at least one operational parameter for transmission of uplink data based on the at least one requested operational parameter.

Another aspect of the disclosure provides a method for wireless communication. The method comprises receiving a first wireless message comprising a request for a first user terminal to transmit uplink data and an indication of at least one requested operational parameter. The method also comprises transmitting a second wireless message in response to the first wireless message, the second wireless message indicating whether a plurality of user terminals including the first user terminal is selected to transmit uplink data, the second wireless message indicating at least one operational parameter for transmission of uplink data based on the at least one requested operational parameter.

Another aspect of the disclosure provides a device for wireless communication. The device comprises a receiver configured to receive a first wireless message comprising a request for a first user terminal to transmit uplink data and an indication of at least one requested operational parameter. The device also comprises a transmitter configured to transmit a second wireless message in response to the first wireless message, the second wireless message indicating whether a plurality of user terminals including the first user terminal is selected to transmit uplink data, the second wireless message indicating at least one operational parameter for transmission of uplink data based on the at least one requested operational parameter.

DETAILED DESCRIPTION

Figure 1:
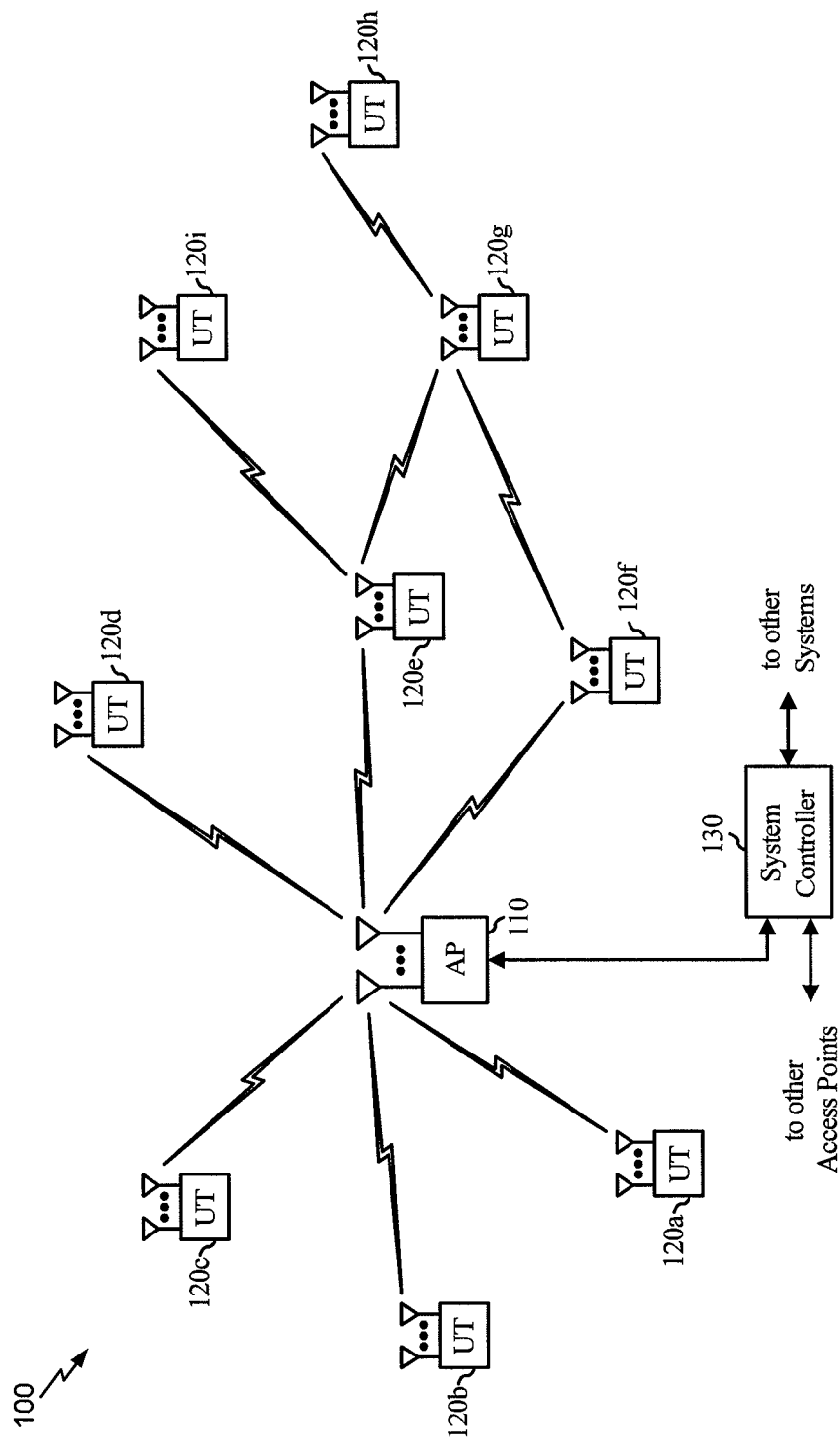
FIG. 1 illustrates a multiple-access multiple-input multiple-output system with access points and user terminals.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA may also be used as an AP.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC- FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station "STA" may also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal or STA may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \leq K \leq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
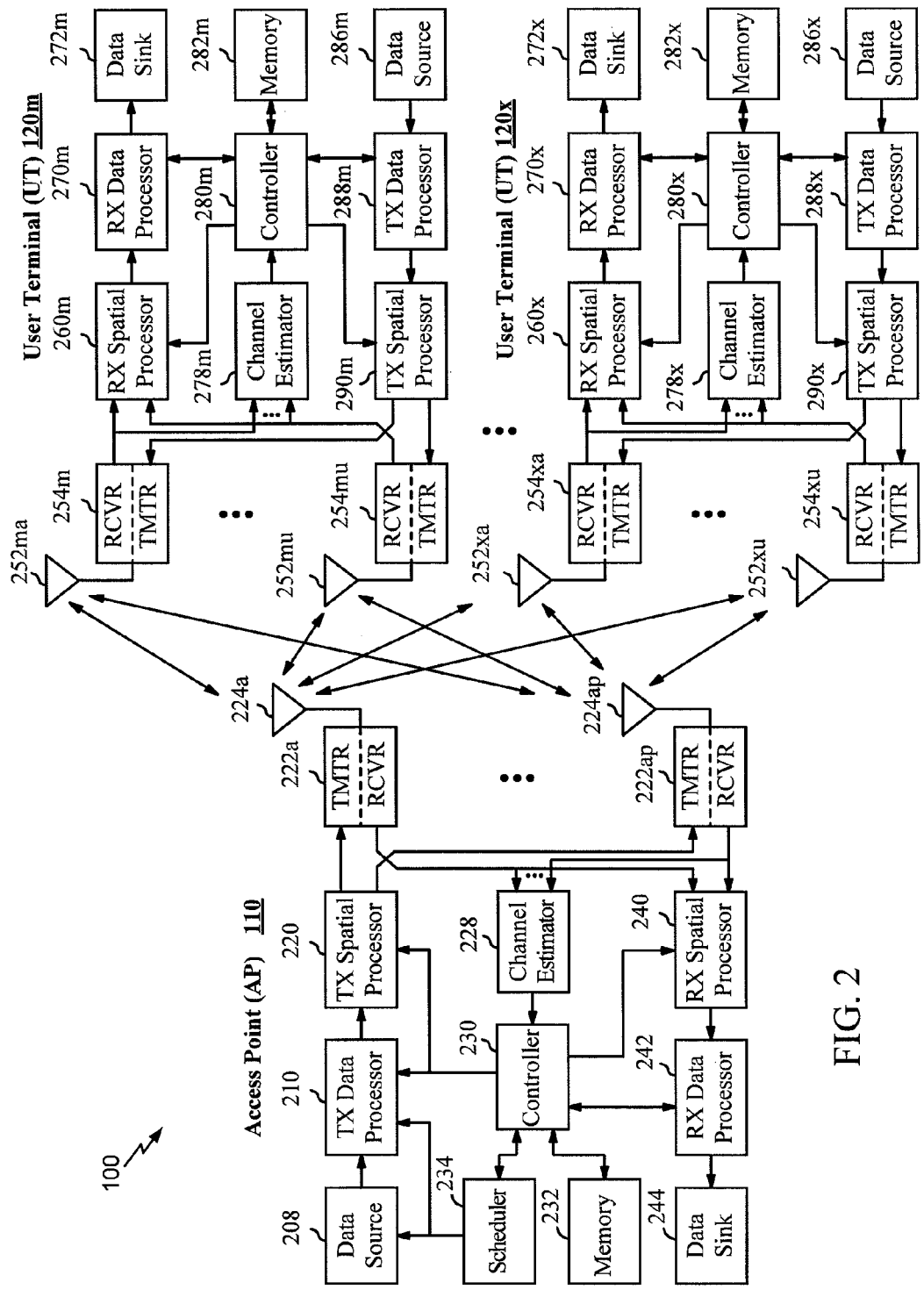
FIG. 2 illustrates a block diagram of the access point 110 and two user terminals 120m and 120x in a multiple-input multiple-output system.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas $252_{ma}$ through $252_{mu}$, and the user terminal 120x is equipped with $N_{ut,x}$ antennas $252_{xa}$ through $252_{xu}$. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit ("TMTR") 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{up}$ antennas 224a through $224_{ap}$ receive the uplink signals from all $N_{up}$ user terminals transmitting on the uplink. Each antenna 224 provides a received signal to a respective receiver unit ("RCVR") 222. Each receiver unit 222 performs processing complementary to that performed by transmitter unit 254 and provides a received symbol stream. An RX spatial processor 240 performs receiver spatial processing on the $N_{up}$ received symbol streams from $N_{up}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{up}$ transmit symbol streams for the $N_{up}$ antennas. Each transmitter unit 222 receives and processes a respective transmit symbol stream to generate a downlink signal. $N_{up}$ transmitter units 222 may provide $N_{up}$ downlink signals for transmission from $N_{up}$ antennas 224, for example to transmit to the user terminals 120.

At each user terminal 120, $N_{ut,m}$ antennas 252 receive the $N_{up}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
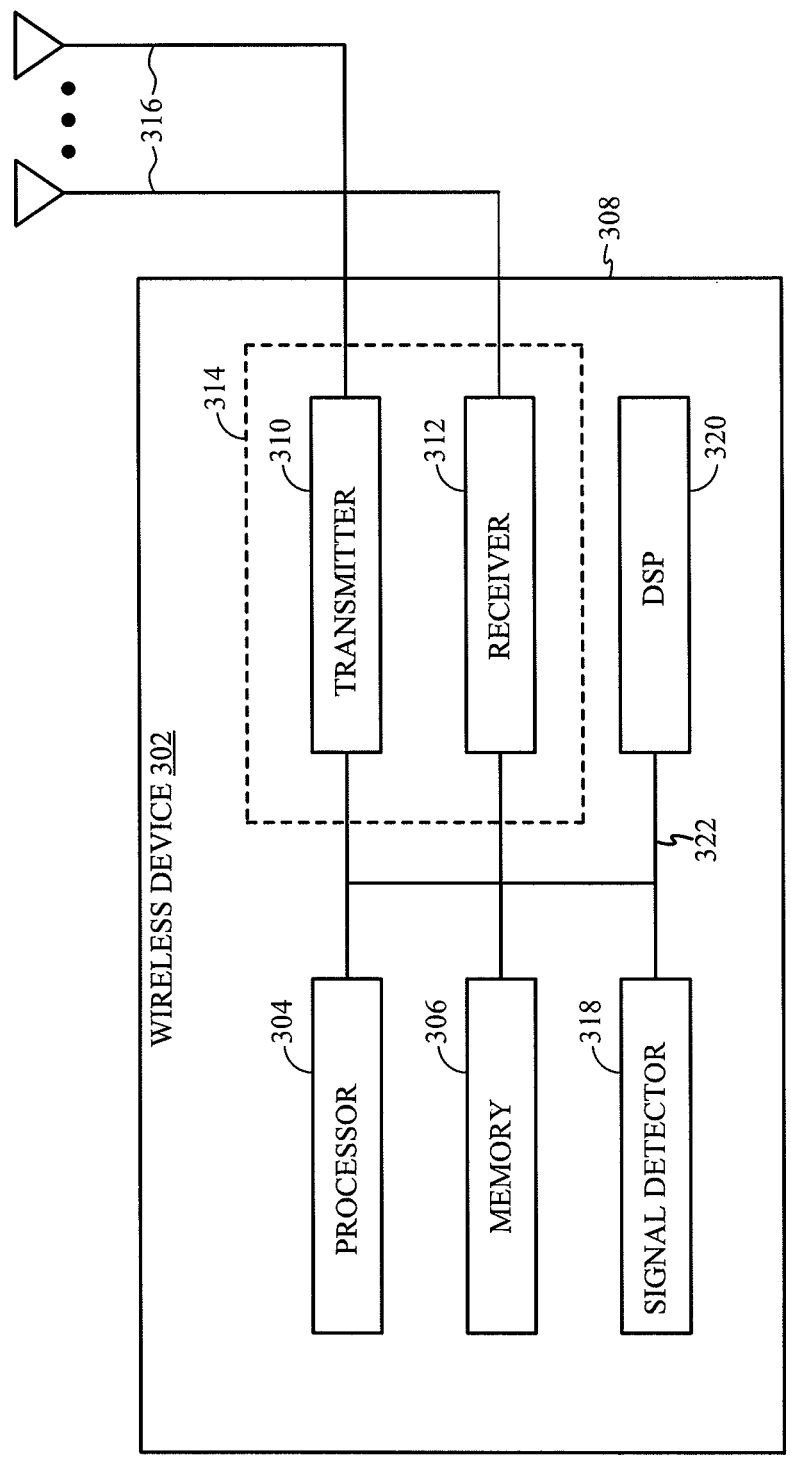
FIG. 3 illustrates various components that may be utilized in a wireless device that may be employed within a wireless communication system.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transceiver antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure support transmitting an uplink (UL) signal from multiple UTs to an AP. In some embodiments, the UL signal may be transmitted in a multi-user MIMO (MU-MIMO) system. Alternatively, the UL signal may be transmitted in a multi-user FDMA (MU-FDMA) or similar FDMA system. Specifically, FIGS. 4-8 illustrate uplink MU-MIMO (UL-MU-MIMO) transmissions 410A and 410B that would apply equally to UL-FDMA transmissions. In these embodiments, UL-MU-MIMO or UL-FDMA transmissions can be sent simultaneously from multiple STAs to an AP and may create efficiencies in wireless communication.

An increasing number of wireless and mobile devices put increasing stress on bandwidth requirements that are demanded for wireless communications systems. With limited communication resources, it is desirable to reduce the amount of traffic passing between the AP and the multiple STAs. For example, when multiple terminals send uplink communications to the access point, it is desirable to minimize the amount of traffic to complete the uplink of all transmissions. Thus, embodiments described herein support utilizing communication exchanges, scheduling and certain frames for increasing throughput of uplink transmissions to the AP.

Figure 4:
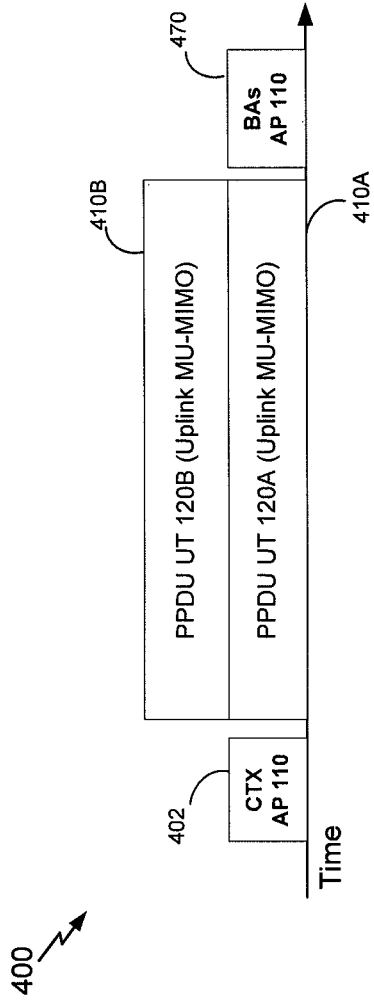
FIG. 4 shows a time diagram of an example frame exchange of an uplink multi-user multiple-input multiple-output communication.

FIG. 4 is a time sequence diagram 400 showing an example of an UL-MU-MIMO protocol 400 that may be used for UL communications. As shown in FIG. 4, in conjunction with FIG. 1, the AP 110 may transmit a clear to transmit (CTX) message 402 to the user terminals 120 indicating which user terminals 120 may participate in the UL-MU-MIMO scheme, such that a particular UT 120 knows to start an UL-MU-MIMO transmission. In some embodiments, the CTX message may be transmitted in a payload portion of a physical layer convergence protocol (PLCP) protocol data units (PPDUs). An example of a CTX frame structure is described more fully below with reference to FIG. 10.

Once a user terminal 120 receives a CTX message 402 from the AP 110 where the user terminal is listed, the user terminal 120 may transmit the UL-MU-MIMO transmission 410. In FIG. 4A, STA 120A and STA 120B transmit UL-MU-MIMO transmissions 410A and 410B, respectively, containing physical layer convergence protocol (PLCP) protocol data units (PPDUs). Upon receiving the UL-MU-MIMO transmissions 410A and 410B, the AP 110 may transmit block acknowledgments (BAs) 470 to the user terminals 120A and 120B.

Not all APs 110 or user terminals 120 may support UL-MU-MIMO or UL-FDMA operation. A capability indication from a user terminal 120 may be indicated in a high efficiency wireless (HEW) capability element that is included in an association request or probe request and may include a bit indicating capability, the maximum number of spatial streams a user terminal 120 can use in a UL-MU-MIMO transmission, the frequencies a user terminal 120 can use in a UL-FDMA transmission, the minimum and maximum power and granularity in the power backoff, and the minimum and maximum time adjustment a user terminal 120 can perform.

A capability indication from an AP 110 may be indicated in a HEW capability element that is included in an association response, beacon or probe response and may include a bit indicating capability, the maximum number of spatial streams a single user terminal 120 can use in a UL-MU-MIMO transmission, the frequencies a single user terminal 120 can use in a UL-FDMA transmission, the required power control granularity, and the required minimum and maximum time adjustment a user terminal 120 should be able to perform.

In one embodiment, capable user terminals 120 may send a request message to a capable AP to be part of the UL-MU-MIMO (or UL-FDMA) protocol. In one aspect, an AP 110 may respond by granting the under terminal 120 the use of the UL-MU-MIMO feature or the AP 110 may deny the user terminal's request. The AP 110 may grant the use of the UL-MU-MIMO and the user terminal 120 may expect a CTX message 402 at a variety of times. Additionally, once a user terminal 120 is enabled to operate the UL-MU-MIMO feature, the user terminal 120 may be subject to following a certain operation mode. The user terminal 120 and the AP 110 may support multiple operation modes and the AP 110 may indicate to the user terminal 120 which mode to use in a HEW capability element, a management frame, or in an operation element. In one aspect, a user terminal 120 may change the operation mode and parameters dynamically during operation by sending a different operating element to the AP 110. In another aspect the AP 110 may switch the operation mode dynamically during operation by sending an updated operating element or a management frame to the user terminal 120, or by sending the updated operating element or the updated management frame in a beacon. In another aspect, the operation mode may be determined by the AP 110 in the setup phase and may be determined per user terminal 120 or for a group of user terminals 120. In another aspect the operation mode may be specified per traffic identifier (TID).

In some operation modes of UL-MU-MIMO transmissions, a user terminal 120 may receive a CTX message from an AP 110 and immediately send a response to the AP 110. The response may be in the form of a clear to send (CTS) message or another type of message. The requirement to send the CTS message may be indicated in the CTX message or the requirement may be indicated in the setup phase of the communication between the AP 110 and the user terminal 120.

Figure 5:
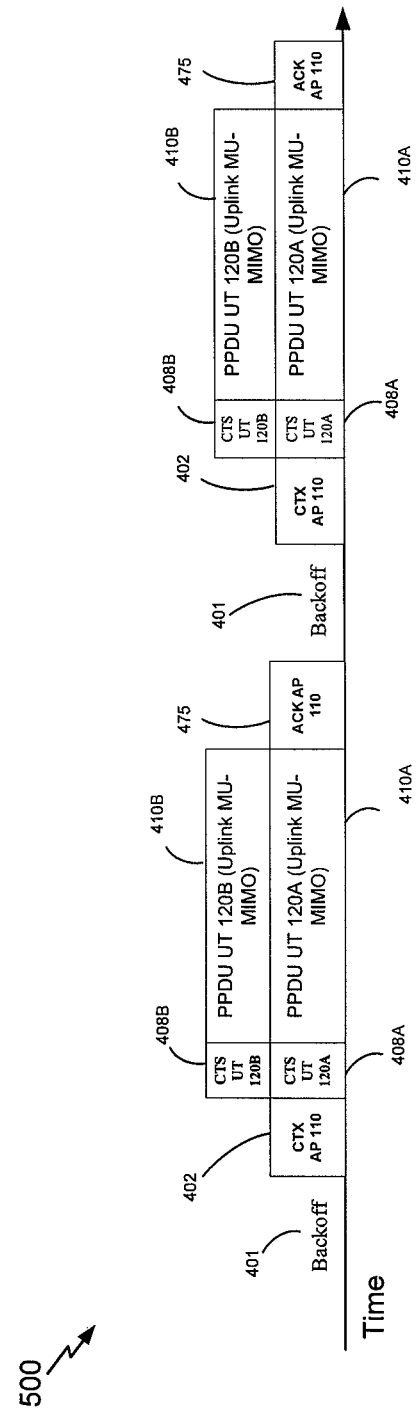
FIG. 5 shows a time sequence diagram of another example frame exchange of an uplink multi-user multiple-input multiple-output communication.

FIG. 5 is a time sequence diagram 500 that, in conjunction with FIG. 1, shows an example of an operation mode of UL-MU-MIMO transmissions between an AP 110 and user terminals 120A and 120B. As shown in FIG. 5, UT 120A may transmit a CTS message 408A and UT 120B may transmit a CTS message 408B in response to receiving the CTX message 402 from the AP 110. The modulation and coding scheme (MCS) of the CTS message 408A and the CTS message 408B may be based on the MCS of the received CTX message 402. In this embodiment, the CTS message 408A and the CTS message 408B contain the same amount of bits and the same scrambling sequence so that they may be transmitted to the AP 110 at the same time. A duration field of the CTS messages 408A and 408B may be based on a duration field in the CTX by removing the time for the CTX PPDU. The user terminal 120A may send an UL-MU-MIMO transmission 410A to the AP 110 according to the CTX message 402 and the user terminal 120B may also send an UL-MU-MIMO transmission 410B to the AP 110 according to the CTX message 402. The AP 110 may then send an acknowledgment (ACK) message 475 to the user terminals 120A and 120B. In some aspects, the ACK message 475 may include serial ACK messages sent to each user terminal 120 or the ACK message 475 may include BAs. In some aspects the ACKs 475 may be polled. This embodiment of FIG. 5 may improve transmission efficiency by providing concurrent transmission of CTS messages 408 from multiple user terminals 120 to an AP 110, compared to sequential transmission, thereby saving time and reducing the possibility of interference.

Figure 6:
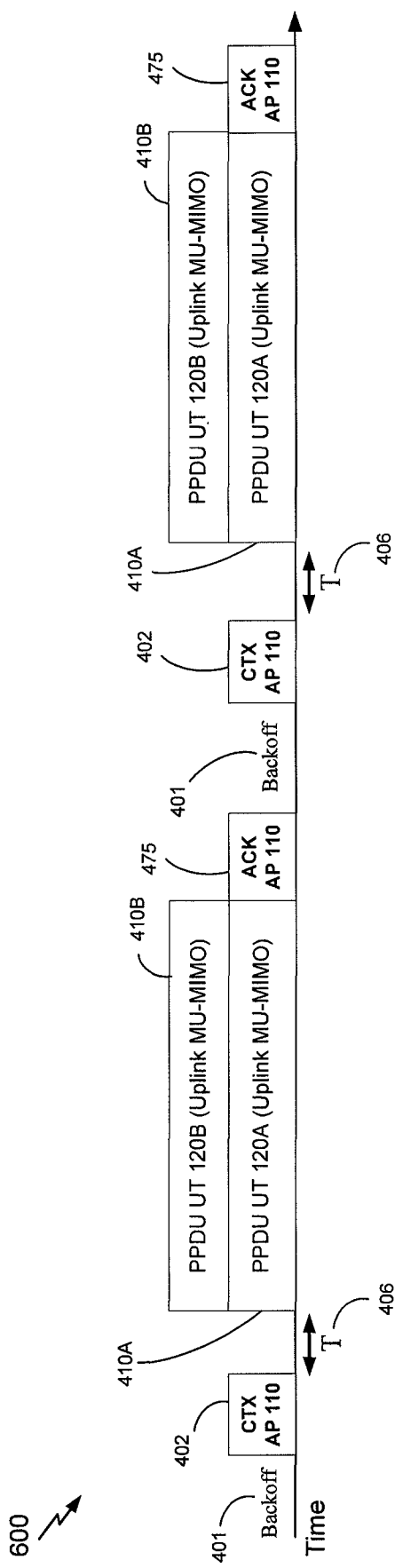
FIG. 6 shows a time sequence diagram of another example frame exchange of an uplink multi-user multiple-input multiple-output communication.

FIG. 6 is a time sequence diagram 600 that, in conjunction with FIG. 1, shows an example of an operation mode of UL-MU-MIMO transmissions. In this embodiment, user terminals 120A and 120B may receive a CTX message 402 from an AP 110. The CTX message 402 may indicate a time (T) 406 after the end of the PPDU carrying the CTX message 402 for the user terminals 120A and 120B to transmit UL-MU-MIMO transmissions. The T 406 may be a short interframe space (SIFS), a point interframe space (PIFS), or another time. The T may include time offsets as indicated by the AP 110 in the CTX message 402 or via a management frame. The SIFS and PIFS time may be fixed in a standard or may be indicated by the AP 110 in the CTX message 402 or in a management frame. The T 406 may improve synchronization between the AP 110 and the user terminals 120A and 120B and it may allow the user terminals 120A and 120B sufficient time to process the CTX message 402, or other messages, before sending their UL-MU-MIMO transmissions.

In some circumstances, a user terminal 120 may have uplink data to upload to the AP 110 but the user terminal 120 may not have received a CTX message 402 or another message indicating that the user terminal 120 may start an UL-MU-MIMO transmission. In certain UL-MU-MIMO operation modes, the user terminals 120 may not transmit data outside of an UL-MU-MIMO transmission opportunity (TXOP) (e.g., after receiving a CTX message). In certain operation modes, the user terminals 120 may transmit a request message to the AP 110 to initialize a UL-MU-MIMO transmission and may then transmit the uplink data to the AP 110 during the subsequent UL-MU-MIMO TXOP, if for example, they are instructed to do so in a CTX message. The request message In some operation modes, the request message may be the only message type that a user terminal 120 may use to initiate a UL-MU-MIMO TXOP. In some embodiments, the user terminal 120 may not transmit outside of an UL-MU-MIMO TXOP other than by sending a request message.

Figure 7:
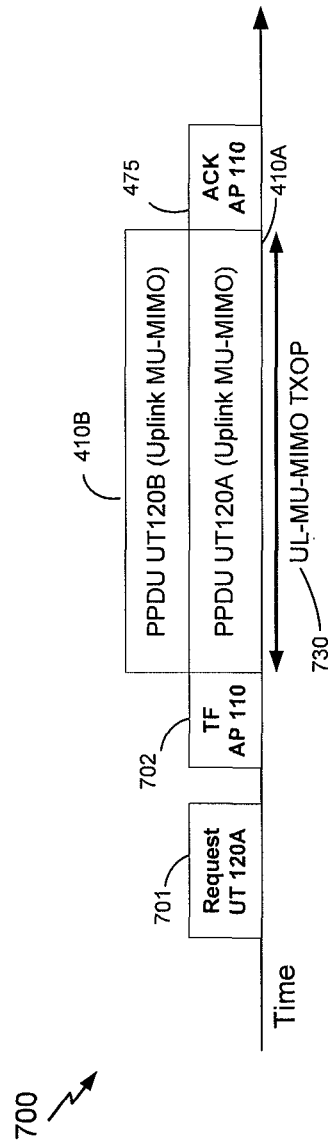
FIG. 7 is a time sequence diagram showing, a multi-user multiple-input multiple-output communications including a user terminal sending a request message to an AP to request and initialize an UL-MU-MIMO transmission.

FIG. 7 is a time sequence diagram 700 showing, in conjunction with FIG. 1, a UL-MU-MIMO communications including a user terminal 120A sending a request message 701 to the AP 110 to request and initialize an UL-MU-MIMO transmission. The request message 701 sent to the AP 110 by the user terminal 120A may include information regarding UL-MU-MIMO transmissions. In other embodiments, the user terminal 120B may send the request message 701. As shown in FIG. 7, the AP 110 may respond to the request message 701 with a trigger frame message 702 (e.g., CTX 402) granting transmission of uplink data to the user terminal 120A immediately following the trigger frame 702. The trigger frame 402 may also grant a UL-MU-MIMO TXOP 730 to user terminal 120A and user terminal 120B for concurrently sending a UL-MU-MIMO transmission 410B with a UL-MU-MIMO transmission 410A, both transmissions 410A and 410B immediately following the trigger frame 702.

The request message 701 requesting a UL-MU-MIMO TXOP may comprise an request-to-send (RTS), a data frame, a quality of service (QoS) null frame, a power save (PS) poll, or a request to transmit (RTX) frame, the frame indicating that the user terminal 120 has uplink data to transmit to the AP 110. In embodiments where the request message 701 comprises a data frame or a QoS null frame, bits 8-15 of the QoS control field may indicate a non-empty queue. The user terminal 120 may determine in the setup phase which data frames (e.g., RTS, data frame, QoS Null frame, PS-poll) will trigger a UL-MU-MIMO transmission.

In another aspect, the AP 110 may respond to the request message 701 with a CTS that grants a single-user (SU) UL TXOP. In another aspect, the AP 110 may respond to the request message 701 with a frame (e.g., ACK or CTX with a special indication) that acknowledges the reception of the request message 701 but does not grant an immediate UL-MU-MIMO TXOP. In another aspect, the AP 110 may respond with a frame that acknowledges the reception of the request message 701, does not grant an immediate UL-MU-MIMO TXOP, but grants a delayed UL-MU-MIMO TXOP and may identify the time that the TXOP is granted. In this embodiment, the AP 110 may send a CTX message 402 to start the UL-MU-MIMO at the granted time.

In another aspect, the AP 110 may respond to the request message 701 with an ACK or other response signal which does not grant the user terminal 120 an UL-MU-MIMO transmission but indicates that the user terminal 120 shall wait for a time (T) before attempting another transmission (e.g., sending another request message). In this aspect the time (T) may be indicated by the AP 110 in the setup phase or in the response signal. In another aspect an AP 110 and a user terminal 120 may agree on a time which the user terminal 120 may transmit a request message 701 or any other request for a UL-MU-MIMO TXOP.

In another operation mode, user terminals 120 may transmit request messages 701 for UL-MU-MIMO transmissions 410 in accordance with regular contention protocol. In another aspect, the contention parameters for user terminals 120 using UL-MU-MIMO are set to a different value than for other user terminals that are not using the UL-MU-MIMO feature. In this embodiment, the AP 110 may indicate the value of the contention parameters in a beacon, in an association response or through a management frame. In another aspect, the AP 110 may provide a delay timer that prevents a user terminal 120 from transmitting for a certain amount of time after each successful UL-MU-MIMO TXOP or after each request message 701. The timer may be restarted after each successful UL-MU-MIMO TXOP. In one aspect, the AP 110 may indicate the delay timer to user terminals 120 in the setup phase or the delay timer may be different for each user terminal 120. In another aspect, the AP 110 may indicate the delay timer in the CTX message 402 or the delay timer may be dependent on the order of the user terminals 120 in the CTX message 402, and may be different for each terminal.

In another operational mode, the AP 110 may indicate a time interval during which the user terminals 120 are allowed to transmit a UL-MU-MIMO transmission. In one aspect, the AP 110 indicates a time interval to the user terminals 120 during which the user terminals are allowed to send a request message 701. In this aspect, the user terminals 120 may use regular contention protocol. In another aspect, the user terminals may not initiate a UL-MU-MIMO transmission during the time interval but the AP 110 may send a CTX or other message to the user terminals to initiate the UL-MU-MIMO transmission.

Figure 8:
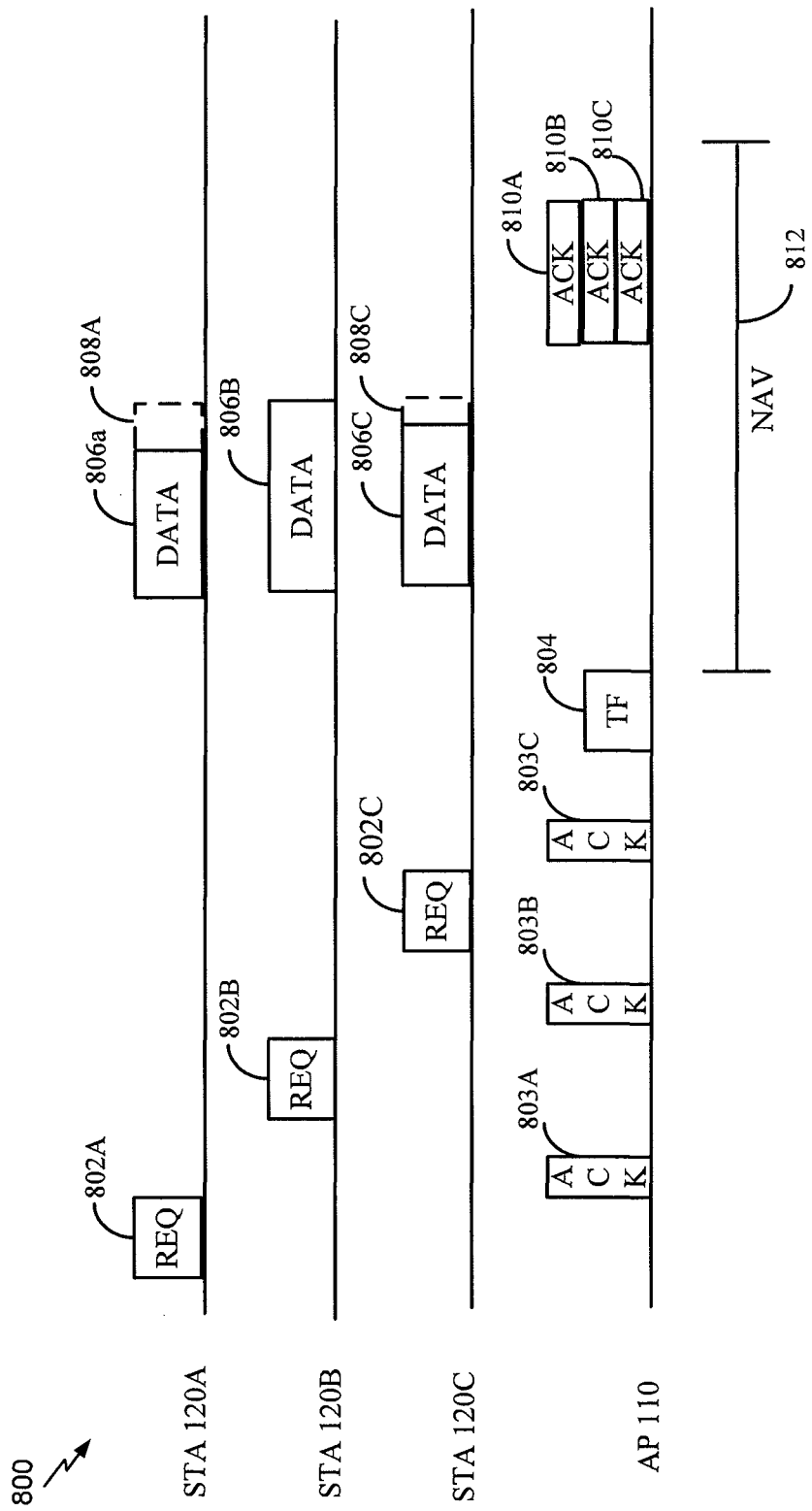
FIG. 8 shows a time sequence diagram of uplink multi-user multiple-input multiple-output communication.

FIG. 8 is a message timing diagram 800 showing multi-user uplink communication. The message exchange shows communication of wireless messages between an AP 110 and three user terminals 120A-C. The message exchange may indicate that each of the user terminals 120A-C may transmit a request message (REQ) 802A-C to the AP 110 requesting a UL-MU-MIMO TXOP. As described above, each of the request messages 802A-C may indicate that the transmitting user terminal 120A-C has data available to be transmitted to the AP 110.

After receiving each of request messages 802A-C, the AP 110 may respond with a message indicating that the AP 110 has received each of the request messages 802A-C from the user terminals 120A-C. As shown in FIG. 8, the AP 110 may transmit ACK messages 803A-C in response to each of the request messages 802A-C. In some embodiments, the AP 110 may transmit a trigger frame (TF) message (e.g., a CTX message) indicating that each of the request messages 802A-C has been received but that the AP 110 has not granted a transmission opportunity for the user terminals 120A-C to uplink data. In FIG. 8, after sending the last ACK message 803C, the AP 110 may transmit a TF message 804. In some aspects, the TF message 804 is transmitted to at least the user terminals 120A-C. In some aspects, the TF message 804 is a broadcast message. The TF message 804 may indicate which user terminals are granted permission to transmit data to the AP 110 during a transmission opportunity. The TF message 804 may also indicate a starting time of the transmission opportunity and a duration of the transmission opportunity. For example, the TF message 804 may indicate that the user terminals 120A-C should set their network allocation vectors to be consistent with NAV 812.

At a time indicated by the TF message 804, the three user terminals 120A-C transmit data 806A-C to the AP 110. The data 806a-c are transmitted at least partially concurrently during the transmission opportunity. The transmissions of data 806A-C may utilize uplink multi-user multiple input, multiple output transmissions (UL-MU-MIMO) or uplink frequency division multiple access (UL-FDMA).

In some aspects, user terminals 120A-C may transmit padded data such that the transmissions of each user terminal transmitting during a transmission opportunity are of equal duration or approximately equal duration. In the message exchange of FIG. 8, the user terminal 120A may transmit pad data 808A, the user terminal 120C may not transmit pad data, and the user terminal 120C may transmit pad data 808c. The transmission of pad data ensures that the transmissions from each of the UTs 120A-C complete at approximately the same time. This may provide for a more equalized transmission power over the entire duration of the transmission, thereby optimizing AP 110 receiver efficiencies.

After the AP 110 receives the data transmissions 806A-C from the user terminals 120A-C, the AP 110 may transmit acknowledgment messages 810A-C to each of the user terminals 120A-C. In some aspects, the acknowledgments messages 810A-C may be transmitted at least partially concurrently using either DL-MU-MIMO or DL-FDMA.

Figure 9:
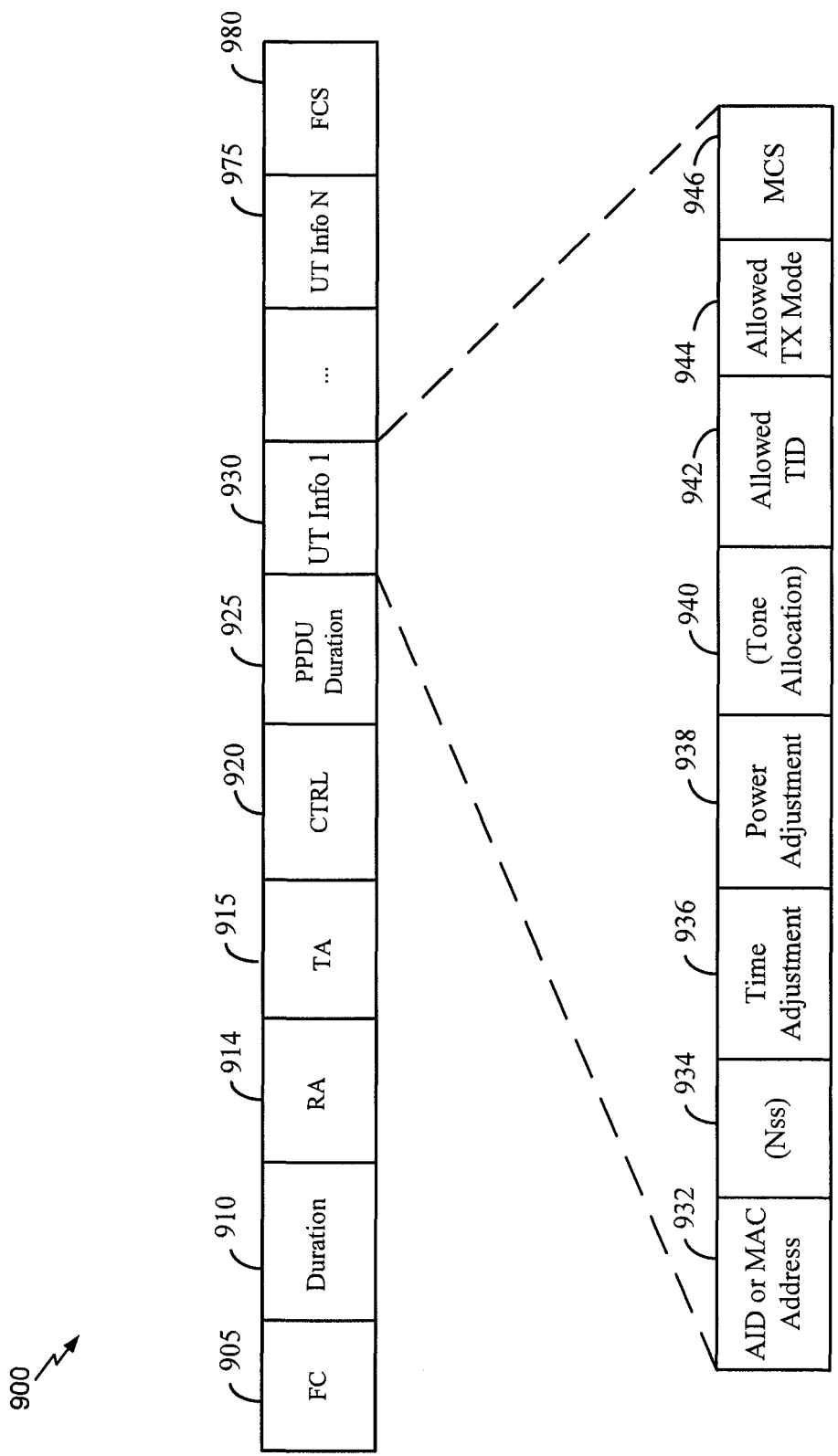
FIG. 9 shows a diagram of an example of a clear to transmit frame format.

FIG. 9 shows a diagram of an example of a CTX frame 900 format. The CTX frame 900 may be configured as a trigger frame. In this embodiment, the CTX frame 900 is a control frame that includes a frame control (FC) field 905, a duration field 910, a receiver address field 914, a transmitter address (TA) field 915, a control (CTRL) field 920, a PPDU duration field 925, a UT info field 930, and a frame check sequence (FCS) field 980. The FC field 905 indicates a control subtype or an extension subtype. The duration field 910 indicates to any receiver of the CTX frame 900 to set the network allocation vector (NAV). In some embodiments the RA 914 field identifies a group of UTs through a multicast MAC address. The TA field 915 indicates the transmitter address or a BSSID. The CTRL field 920 is a generic field that may include information regarding the format of the remaining portion of the frame (e.g., the number of UT info fields and the presence or absence of any subfields within a UT info field), indications for rate adaptation for the user terminals 120, indication of allowed TID, and indication that a CTS must be sent immediately following the CTX frame 900. The CTRL field 920 may also indicate if the CTX frame 900 is being used for UL-MU-MIMO or for UL FDMA or both, indicating whether a Nss or Tone allocation field is present in the UT Info field 930. Alternatively, the indication of whether the CTX is for UL-MU-MIMO or for UL FDMA can be based on the value of the subtype. Note that UL-MU-MIMO and UL FDMA operations can be jointly performed by specifying to a UT both the spatial streams to be used and the channel to be used, in which case both fields are present in the CTX; in this case, the Nss indication is referred to a specific tone allocation. The PPDU duration 925 field indicates an uplink duration for the following uplink transmission (e.g., UL-MU-MIMO PPDU). The AP 110 may determine the duration of the following Mu-MIMO PPDU that the user terminals 120 are allowed to send based on estimated TX time fields received in at least one message requesting to transmit uplink data from the user terminals 120. The UT Info 930 field contains information regarding a particular UT and may include a per-user terminal 120 set of information (see the UT Info 1 field 930 through the UT Info N field 975). The UT Info 930 field may include an AID or MAC address field 932 which identifies a user terminal, a number of spatial streams field (Nss) 935 field which indicates the number of spatial streams a user terminal may use (e.g., in a UL-MU-MIMO system), a Time Adjustment 936 field which indicates a time that a UT should adjust its transmission compared to the reception of a trigger frame (the CTX in this case), a Power Adjustment 938 field which indicates a power backoff value a UT should take from a declared transmit power, a Tone Allocation 940 field which indicates the tones or frequencies a UT may use (in a UL-FDMA system), an Allowed TID 942 field which indicates the allowable TID, an Allowed TX Mode 944 field which indicates the allowed TX modes, and a MCS 946 field which indicates the MCS the UT should use. A user terminal 120 receiving a CTX with a Allowed TID 942 indication may be allowed to transmit data only of that TID, data of the same or higher TID, data of the same or lower TID, any data, or only data of that TID first, then if no data is available, data of other TIDs. The FCS 980 field indicates the carries an FCS value used for error detection of the CTX frame 900.

Figure 10:
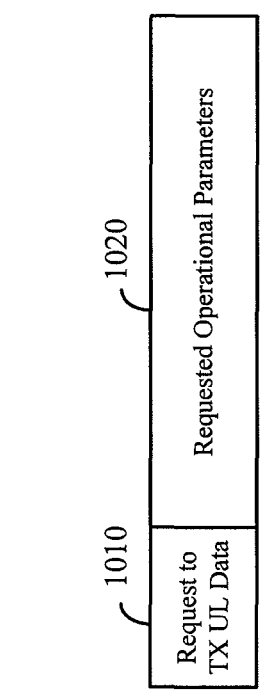
FIG. 10 shows a diagram of a request message sent by a user terminal to request transmission of uplink data

FIG. 10 shows a diagram of a request message 701 sent by a user terminal 120 to request transmission of uplink data. The request message 701 may comprise a request to transmit uplink data 1010. The request to transmit uplink data 1010 may comprise a request for a UL-MU-MIMO TXOP. The request to transmit uplink data 1010 may comprise a frame indicating to the AP 110 that the user terminal 120 has uplink data buffered to send. For example, the request to transmit uplink data 1010 may comprise an RTS, PS-poll, QoS null, data, or management frame set to indicate more data. In some embodiments, a data frame or QoS Null frame may have bits 8-15 of the QoS control frame set to indicate more data. The user terminal 120 and the AP 110 may determine during setup which frames may indicate the request to transmit uplink data 1010. In other embodiments, the user terminal 120 may send single user uplink data and may indicate a request for an UL-MU-MIMO TXOP by setting bits in the QoS control frame of its data packet.

The request message 701 may also comprise requested operational parameters 1020 for transmitting uplink data. The requested operational parameters 1020 may comprise operational parameters for the user terminal 120 to employ for UL-MU-MIMO transmissions. For example, the requested operational parameters 1020 may indicate an operating mode for when the user terminal 120 may transmit a request message 701, an estimated transmission time for the uplink data, a buffer status indicating the number of bytes pending for transmission, management information, user terminal operating modes, a contention parameter, a number of spatial streams the user terminal 120 may employ for uplink data transmission, a time adjustment compared to the reception of the trigger frame for the uplink transmission, a power backoff value for the user terminal 120 to take from a declared transmit power, tones, frequencies, or channels, for the user terminal 120 to employ in transmission, an allowable TID, allowed TX modes, an MCS that the user terminal 120 may employ for uplink transmissions, transmission power parameters, and per TID queue information. In one embodiment, the request to transmit uplink data 1010 may comprise a QoS null frame and the requested operational parameters 1020 may include transmission power information and per TID queue information which may be inserted in two bytes of a sequence control and a QoS control field of the QoS null frame. The request message 701 may also comprise a request-to-transmit (RTX) frame specifically formatted to contain the request to transmit uplink data 1010 and the requested operating parameters 1020 as further described below with reference to FIG. 11.

As described above, the AP 110 may send the trigger frame (e.g., CTX message 402) in response to receiving the request message 701 from the user terminal 120. The trigger frame may comprise operational parameters for the user terminal 120 to employ for uplink transmissions. The AP 110 may determine the operational parameters indicated in the trigger frame based on the requested operational parameters 1020 received from the user terminal 120. In some embodiments, before an UL-MU-MIMO communication can take place, an AP 110 may collect information from the user terminals 120 that are participating in the UL-MU-MIMO communication. The AP 110 may optimize the collection of information from the user terminals 120 by scheduling the UL transmissions from the user terminals 120.

Figure 11:
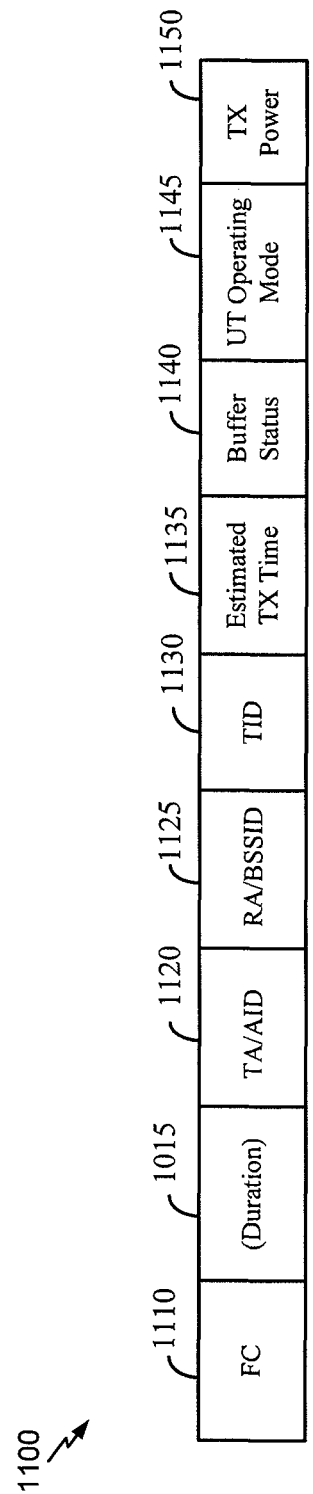
FIG. 11 shows a diagram of a request to transmit frame.

FIG. 11 shows a diagram of a request-to-transmit (RTX) frame 1100. The RTX frame 1100 may include a frame control (FC) field 1110, an optional duration field 1115, a transmitter address/allocation identifier (TA/AID) field 1120, a receiver address/basic service set identifier (RA/BSSID) field 1125, a TID field 1130, an estimated transmission (TX) time field 1135, a buffer status field 140, a UT operating mode field 1145, and a TX power field 1150. The FC field 1110 may indicate a control subtype or an extension subtype. The duration field 1115 may indicate to any receiver of the RTX frame 1100 to set the network allocation vector (NAV). In one aspect, the RTX frame 1100 may not have a duration field 1115. The TA/AID field 1120 may indicate a source address, which may be an AID or a full MAC address. The RA/BSSID field 1125 may indicate the RA or BSSID. In one aspect, the RTX frame 1100 may not contain a RA/BSSID field 1125. The TID field 1130 may indicate an access category (AC) for which a user terminal has data. The estimated TX time field 1135 may indicate a time requested for the uplink transmission (e.g., UL-TXOP) based on an amount of time required for a user terminal 120 to send all the data in its buffer at the current planned MCS. The buffer status field 1140 may indicate a number of bytes pending at the user terminal 120 for uplink transmission. The UT operating mode field 1145 may indicate set management information or operating modes for the user terminal 120. The TX power field 1150 may indicate the power at which the RTX frame 1100 is being transmitted and may be used by the AP 110 to estimate the link quality and adapt the power backoff indication in a CTX frame.

In other embodiments, the RTX frame 1100 may comprise fields indicating a contention parameter, a number of spatial streams, a time adjustment for the uplink transmission, a power backoff value, tones, frequencies, or channels, for transmission, an allowable TID, allowed TX modes, an MCS, transmission power parameters, or per TID queue information as discussed above with reference to the requested operational parameters 1020 of FIG. 10. In other embodiments, the RTX frame 1100 may further include any parameter that a user terminal 120 may use for transmitting uplink data.

Figure 12:
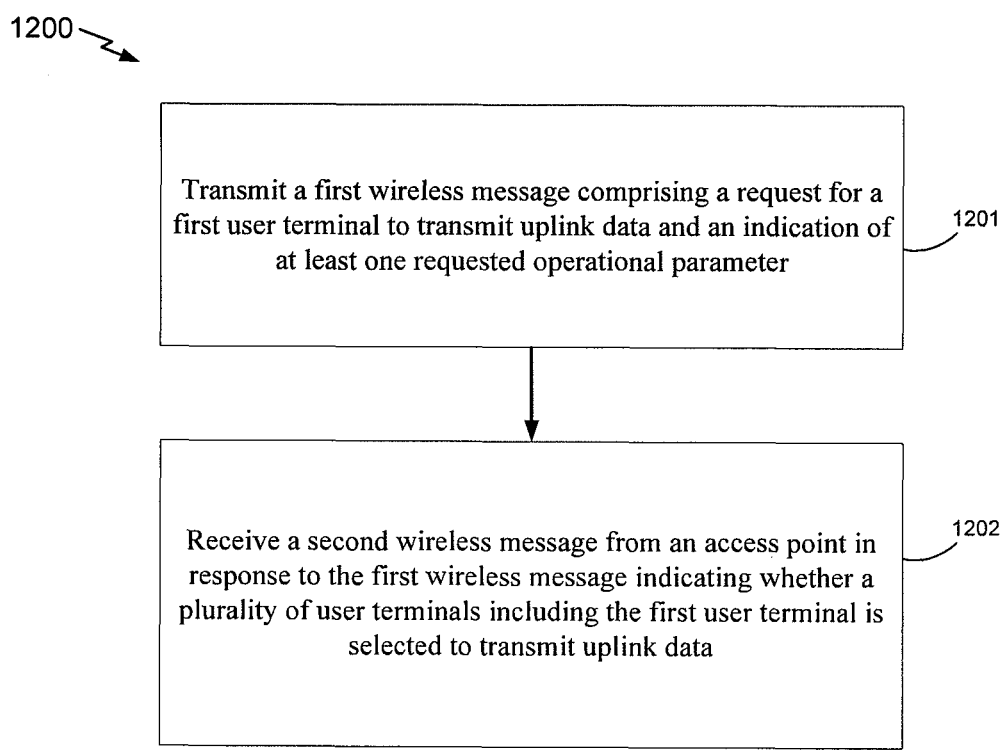
FIG. 12 shows a flow chart of a method for requesting transmission of uplink data.

FIG. 12 shows a flow chart 1200 of a method for requesting transmission of uplink data. At block 201, the method may transmit a first wireless message comprising a request for a first user terminal to transmit uplink data and an indication of at least one requested operational parameter. At block 1202, the method may receive a second wireless message indicating whether a plurality of user terminals including the first user terminal is selected to transmit uplink data. The first message may be received from an access point in response to the first wireless message. The second wireless message may indicate at least one operational parameter for transmission of uplink data based on the at least one requested operational parameter.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
transmitting, by a first user terminal, at a transmission power level, a first wireless message comprising a request for the first user terminal to transmit uplink data and an indication of at least one requested operational parameter, the first wireless message further indicating the transmission power level; and
receiving by the first user terminal, a second wireless message from an access point in response to the first wireless message, the second wireless message indicating which user terminals of a plurality of user terminals including the first user terminal is selected to transmit uplink data, the second wireless message indicating at least one operational parameter for transmission of uplink data based on the at least one requested operational parameter, the second wireless message further comprising a power back-off indication, the power back-off indication based on the transmission power level of the first wireless message.

2. The method of claim 1, wherein the request for the first user terminal to transmit uplink data comprises a request for an uplink multiuser multiple-input multiple-output transmission opportunity.

3. The method of claim 1, wherein the at least one requested operational parameter comprises a transmission time requested for the uplink data.

4. The method of claim 3, wherein the estimated transmission time parameter indicates a time duration for an uplink multiuser multiple-input multiple-output transmission opportunity.

5. The method of claim 3, wherein the estimated transmission time parameter indicates a time duration required for the first user terminal to transmit the uplink data at a planned modulation and coding scheme.

6. The method of claim 3, wherein the at least one operational parameter for transmission of uplink data comprises an uplink duration parameter indicating an uplink transmission duration for the plurality of user terminals to transmit uplink data, the uplink transmission duration based on the estimated transmission time.

7. The method of claim 1, wherein the at least one requested operational parameter indicates, a user terminal operating mode, a contention parameter, a number of spatial streams to employ for uplink data transmission, a time adjustment compared to the reception of the second wireless message for starting uplink transmissions a channel for uplink transmissions, a traffic identifier, a transmission mode, and per-traffic identifier queue information.

8. The method of claim 1, further comprising transmitting the uplink data by the first user terminal in an uplink multiuser multiple-input multiple-output transmission concurrently with the user terminals of the plurality of user terminals selected to transmit uplink data.

9. The method of claim 1, wherein the first wireless message comprises a request to transmit frame, a request to send frame, a data frame, a quality of service frame, or a power save poll frame.

10. The method of claim 1, wherein the second wireless message comprises a clear to transmit message.

11. The method of claim 1, wherein the at least one operational parameter identifies a start time for the uplink transmission that is immediately following the second wireless message.

12. The method of claim 1, wherein the second wireless message acknowledges the reception of the first wireless message but does not select the first user terminal to transmit uplink data.

13. The method of claim 1, wherein the second wireless message acknowledges the reception of the first wireless message and grants the first user terminal an uplink transmission at a delayed start time.

14. A device for wireless communication, comprising:
a transmitter configured to transmit, at a transmission power level, a first wireless message comprising a request for a first user terminal to transmit uplink data and an indication of at least one requested operational parameter, the first wireless message further indicating the transmission power level; and
a receiver configured to receive a second wireless message from an access point in response to the first wireless message, the second wireless message indicating which user terminals of a plurality of user terminals including the first user terminal is selected to transmit uplink data, the second wireless message indicating at least one operational parameter for transmission of uplink data based on the at least one requested operational parameter, the second wireless message further comprising a power back-off indication, the power back-off indication based on the transmission power level of the first wireless message.

15. The device of claim 14, wherein the request for the first user terminal to transmit uplink data comprises a request for an uplink multiuser multiple-input multiple-output transmission opportunity.

16. The device of claim 14, wherein the at least one requested operational parameter comprises a transmission time requested for the uplink data.

17. The device of claim 16, wherein the estimated transmission time parameter indicates a time duration for an uplink multiuser multiple-input multiple-output transmission opportunity.

18. The device of claim 16, wherein the estimated transmission time parameter indicates a time duration required for the first user terminal to transmit the uplink data at a planned modulation and coding scheme.

19. The device of claim 16, wherein the at least one operational parameter for transmission of uplink data comprises an uplink duration parameter indicating an uplink transmission duration for the plurality of user terminals to transmit uplink data, the uplink transmission duration based on the estimated transmission time.

20. The device of claim 14, wherein the at least one requested operational parameter indicates a user terminal operating mode, a contention parameter, a number of spatial streams to employ for uplink data transmission, a time adjustment compared to the reception of the second wireless message for starting uplink transmissions, a channel for uplink transmissions, a traffic identifier, a transmission mode, and per-traffic identifier queue information.

21. The device of claim 14, wherein the transmitter is further configured to transmit the uplink data in an uplink multiuser multiple-input multiple-output transmission concurrently with the user terminals of the plurality of user terminals selected to transmit uplink data.

22. The device of claim 14, wherein the first wireless message comprises a request to transmit frame, a request to send frame, a data frame, a quality of service frame, or a power save poll frame.

23. The device of claim 14, wherein the second wireless message comprises a clear to transmit message.

24. The device of claim 14, wherein the at least one operational parameter identifies a start time for the uplink transmission that is immediately following the second wireless message.

25. The device of claim 14, wherein the second wireless message acknowledges the reception of the first wireless message but does not select the first user terminal to transmit uplink data.

26. The device of claim 14, wherein the second wireless message acknowledges the reception of the first wireless message and grants the first user terminal an uplink transmission at a delayed start time.

27. A method for wireless communication, comprising:
receiving a first wireless message comprising a request for a first user terminal to transmit uplink data and an indication of at least one requested operational parameter, the first wireless message further comprising an indication of a transmission power level of the first wireless message;
determining a power backoff indication based on the transmission power level; and
transmitting a second wireless message in response to the first wireless message, the second wireless message indicating which user terminals of a plurality of user terminals including the first user terminal is selected to transmit uplink data, the second wireless message indicating at least one operational parameter for transmission of uplink data based on the at least one requested operational parameter, the second wireless message further comprising the power backoff indication.

28. The method of claim 27, wherein the at least one requested operational parameter comprises an estimated transmission time parameter indicating a time duration required for the first user terminal to transmit the uplink data and the at least one operational parameter for transmission of the uplink data comprises an uplink duration parameter indicating an uplink transmission duration for the plurality of user terminals to transmit uplink data, the uplink transmission duration based on the estimated transmission time.

29. A device for wireless communication, comprising:
a receiver configured to receive a first wireless message comprising a request for a first user terminal to transmit uplink data and an indication of at least one requested operational parameter, the first wireless message further comprising an indication of a transmission power level of the first wireless message;
determining a power backoff indication based on the transmission power level; and
a transmitter configured to transmit a second wireless message in response to the first wireless message, the second wireless message indicating which user terminals of a plurality of user terminals including the first user terminal is selected to transmit uplink data, the second wireless message indicating at least one operational parameter for transmission of uplink data based on the at least one requested operational parameter, the second wireless message further comprising the power backoff indication.

30. The device of claim 29, wherein the at least one requested operational parameter comprises an estimated transmission time parameter indicating a time duration required for the first user terminal to transmit the uplink data and the at least one operational parameter for transmission of the uplink data comprises an uplink duration parameter indicating an uplink transmission duration for the plurality of user terminals to transmit uplink data, the uplink transmission duration based on the estimated transmission time.

31. The method of claim 7, wherein the at least one operational parameter indicates a user terminal operating mode, the operating mode indicating whether the first user terminal initiates an uplink during a time interval indicated by the access point or initiates an uplink based on a contention protocol.

32. The method of claim 7, wherein the at least one operational parameter indicates a number of spatial streams to employ for uplink transmission.

33. The method of claim 7, wherein the at least one operational parameter indicates a channel for uplink transmissions.

34. The method of claim 7, wherein the at least one operational parameter indicates a traffic identifier for uplink transmissions.

35. The method of claim 34, wherein the at least one operational parameter indicates per-traffic identifier queue information.

36. The method of claim 1, wherein the second wireless message indicates a time adjustment relative to the reception of the second wireless message for starting uplink transmissions.

* * * * *